(12) United States Patent
Naito et al.

(10) Patent No.: US 8,587,793 B2
(45) Date of Patent: Nov. 19, 2013

(54) PRINT IMAGE PROCESSING APPARATUS AND COMPUTER READABLE MEDIUM

(75) Inventors: Takao Naito, Kanagawa (JP); Kazuo Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 353 days.

(21) Appl. No.: 12/912,278

(22) Filed: Oct. 26, 2010

(65) Prior Publication Data

US 2011/0317205 A1  Dec. 29, 2011

(30) Foreign Application Priority Data

Jun. 23, 2010 (JP) ................ 2010-142893

(51) Int. Cl.
*G06F 3/12* (2006.01)
*G06K 9/54* (2006.01)

(52) U.S. Cl.
USPC ......... 358/1.13; 358/1.1; 358/1.15; 358/1.16; 358/538; 382/304; 382/305; 382/276; 718/100; 718/105; 718/106

(58) Field of Classification Search
USPC ........... 358/1.1, 1.4, 1.9, 1.11–1.18; 382/276, 382/302–308; 715/234, 246; 710/72
See application file for complete search history.

(56) References Cited

U.S. PATENT DOCUMENTS

| | | | |
|---|---|---|---|
| 6,266,497 B1 | 7/2001 | Mackawa | |
| 7,072,052 B1 * | 7/2006 | Tanahashi et al. | 358/1.1 |
| 2004/0187126 A1 | 9/2004 | Yoshimura | |
| 2004/0243934 A1 * | 12/2004 | Wood et al. | 715/517 |
| 2006/0061794 A1 | 3/2006 | Ito et al. | |
| 2009/0237697 A1 * | 9/2009 | Caruso et al. | 358/1.13 |

FOREIGN PATENT DOCUMENTS

| | | |
|---|---|---|
| JP | A-2000-168148 | 6/2000 |
| JP | A-2004-252900 | 9/2004 |
| JP | A-2005-202667 | 7/2005 |
| JP | A-2006-88433 | 4/2006 |
| JP | A-2009-3765 | 1/2009 |

* cited by examiner

*Primary Examiner* — Chad Dickerson
(74) *Attorney, Agent, or Firm* — Oliff & Berridge, PLC

(57) ABSTRACT

A print image processing apparatus, includes N image processing circuits; a selection unit that estimates, every N pages, a necessary time corresponding to each of (i) a page-based parallel method for allocating image processing of the N pages to the image processing circuits in units of pages to perform the image processing of the N pages in parallel, and (ii) a paginal-object-based parallel method for allocating image processing of each single page to the image processing circuits in units of objects to perform the image processing of the objects of each single page in parallel, and selects one of the page-based parallel method and the paginal-object-based parallel method such that the estimated necessary time corresponding to the selected one of the parallel methods is shorter than the estimated necessary time; and an allocation unit that allocates image processing of the N pages to the N image processing circuit, respectively.

10 Claims, 15 Drawing Sheets

FIG. 2

| | OBJECT SIZE | ESTIMATED NECESSARY TIME [ms] SUM OF SIZE*(1000/f)* SUM OF AMOUNTS OF PROCESSING TIME THAT LATENCY OF EACH CONFIGURATION IS CONSIDERED | COMPARISON OF SIZE TO THRESHOLD OBJECT OF SMALL SIZE (0) IS NOT SUBJECTED TO DRP PROCESSING |
|---|---|---|---|
| PAGE 1 | Obj_size1 | t1 | 1 |
| | Obj_size2 | t2 | 1 |
| | Obj_size3 | t3 | 0 |
| | ... | t4 | 1 |
| PAGE 2 | Obj_size11 | t5 | 0 |
| | Obj_size12 | t6 | 1 |
| | Obj_size13 | t7 | 1 |
| PAGE 3 | ... | ... | 1 |
| | ... | ... | 1 |
| | ... | ... | 1 |
| PAGE N | ... | ... | 1 |

FIG. 3

| SERVER | DRP# | STATUS | JOB PRIORITY |
|---|---|---|---|
| 1 | 1 | FULL (IN USE) | 4 |
| | 2 | READY (UNUSED) | 1 |
| | 3 | READY | 2 |
| | 4 | READY | 3 |
| | 5 | FULL | 5 |

FIG. 12

|  | OBJECT PIXEL SIZE | PROCESSING TIME PREDICTION [ms] SUM OF SIZE*(1000/f)* SUM OF AMOUNTS OF PROCESSING TIME THAT LATENCY OF EACH CONFIGURATION IS CONSIDERED | THRESHOLD < Obj_size |
|---|---|---|---|
| PAGE 1 | Obj_size11 = 300K | 300 | 1 |
|  | Obj_size12 = 30K | 30 | 1 |
|  | Obj_size13 = 40K | 40 | 1 |
|  | Obj_size14 = 100K | 100 | 1 |
| PAGE 2 | Obj_size25 = 70K | 70 | 1 |
| PAGE 3 | Obj_size31 = 80K | 80 | 1 |
|  | Obj_size32 = 100K | 100 | 1 |
|  | Obj_size33 = 120K | 120 | 1 |
| PAGE 4 | Obj_size41 = 400K | 400 | 1 |
| PAGE 5 | Obj_size51 = 70K | 70 | 1 |
|  | Obj_size52 = 80K | 80 | 1 |
|  | Obj_size53 = 100K | 100 | 1 |
|  | Obj_size54 = 120K | 120 | 1 |
|  | Obj_size55 = 100K | 100 | 1 |
|  | Obj_size56 = 120K | 120 | 1 |
| PAGE 6 | Obj_size61 = 120K | 120 | 1 |
|  | Obj_size62 = 50K | 50 | 1 |
|  | Obj_size63 = 100K | 100 | 1 |
| PAGE 7 | Obj_size71 = 0K | 0 | - |
| PAGE 8 | Obj_size81 = 0K | 0 | - |

PAGINAL-OBJECT-BASED PARALLEL MODE

PRINT IMAGE PROCESSING APPARATUS AND COMPUTER READABLE MEDIUM

CROSS-REFERENCE TO RELATED APPLICATION

This application is based on and claims priority under 35 USC 119 from Japanese Patent Application No. 2010-142893 filed on Jun. 23, 2010.

BACKGROUND

1. Technical Field

The present invention relates to a print image processing apparatus and a computer readable medium.

2. Related Art

A digital printing apparatus converts print data described in a page description language (PDL) to a bitmap image (referred to also as a raster image) of each page. Then, the digital printing apparatus supplies bitmap image data of each page to a print engine and causes the print engine to print the bitmap image data on paper. In the process of generating a bitmap image of each page, bitmap image processing, such as color space conversion processing, rotation, expansion/reduction, turning, or halftoning, is performed on an image at a middle stage of the process, if necessary. Such image processing may be implemented by software. However, from the viewpoint of processing speed, it is frequent that such image processing is implemented by dedicated hardware image processing circuits.

In addition, there is a system that is provided with a plurality of image processing circuits in order to increase processing speed and configured to cause the image processing circuits to perform image processing. A page-based parallel method of allocating processing of data to each image processing circuit in units of pages is provided as a method of performing parallel processing in a system of such a type.

SUMMARY

According to a method (hereinafter referred to as a page-based parallel method) of performing parallel processing by allocating processing of data to plural of image processing circuits in units of pages, if the processing load of an earlier page is larger than that of a later page, when both the pages are subjected to parallel processing, a result of processing of the later page is obtained earlier than a result of processing of the earlier page. However, the results are printed in the ascending order of page numbers. Thus, when such an "overpass" occurs, the later page whose processing is completed earlier the processing of the earlier page waits for the completion of the processing of the earlier page. If such a waiting-time is too long, waste in processing increases.

A "paginal-object-based parallel method" of performing parallel processing by allocating plural of objects in each page to plural of image processing circuits is considered as a countermeasure against this problem. According to the "paginal-object-based parallel method", results of the processing of data are obtained in the ascending order of page numbers. In addition, parallel processing is performed in units of objects. The printing of a first page of a document is quicken. However, if a page contains objects of the number less than that of image processing circuits, some image processing circuits are unused in the image processing of the objects contained in the page. If the number of such pages is large, a desired processing speed may not be obtained.

According to an aspect of the invention, a print image processing apparatus, includes: N image processing circuits (N is an integer equal to or more than 2); a selection unit that estimates, every N pages, a necessary time corresponding to each of (i) a page-based parallel method for allocating image processing of the N pages to the image processing circuits in units of pages to perform the image processing of the N pages in parallel, and (ii) a paginal-object-based parallel method for allocating image processing of each single page to the image processing circuits in units of objects to perform the image processing of the objects of each single page in parallel, and selects one of the page-based parallel method and the paginal-object-based parallel method such that the estimated necessary time corresponding to the selected one of the parallel methods is shorter than the estimated necessary time corresponding to the other parallel method; and an allocation unit that allocates image processing of the N pages to the N image processing circuit, respectively, according to the parallel method selected by the selection unit.

BRIEF DESCRIPTION OF THE DRAWINGS

Exemplary embodiments of the invention will be described in detail based on the following figures, wherein:

FIG. 2 is a table (object table) illustrating an example of a result of analysis of print document data 200;

FIG. 3 is a table illustrating an example of data contents of a dynamically reconfigurable processor (DRP) status register;

FIG. 12 is a table illustrating an example of the object table generated corresponding to the page group exemplified in FIG. 11;

DETAILED DESCRIPTION

An example of the apparatus configuration of a printing system according to an exemplary embodiment of the invention is described with reference to FIG. 1.

Figure 1:
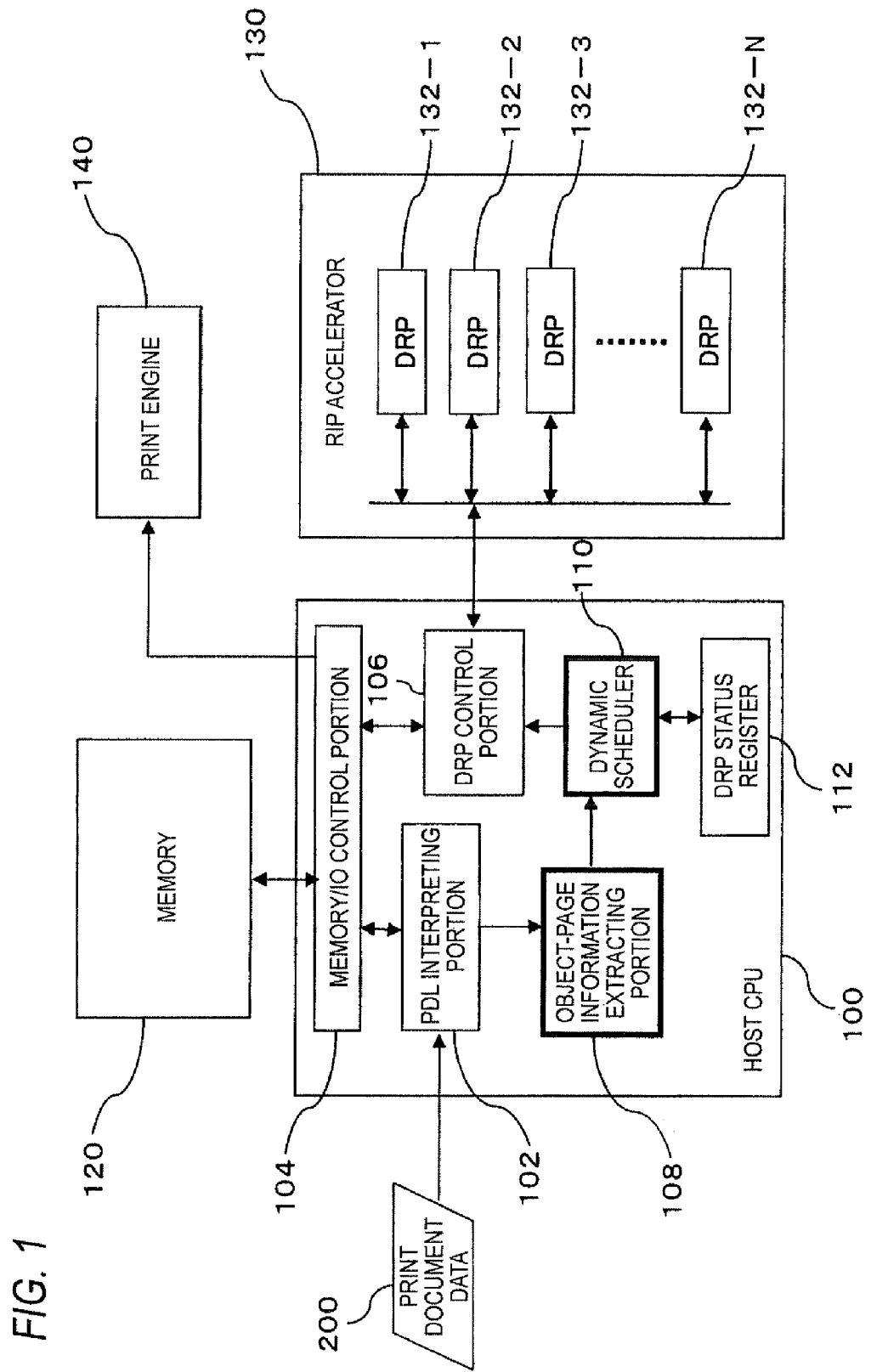
FIG. 1 is a diagram illustrating an example of the configuration of a print image processing apparatus according to an exemplary embodiment of the invention.

The printing system illustrated in FIG. 1 includes a host CPU 100, a memory 120, a raster image processing (RIP) accelerator 130 and a print engine 140.

The host CPU 100 is a central processing unit (CPU) generates image data of each page by processing print document data 200 described in a page description language (PDL). The PDL is a language or format in which an image of each page to be subjected to output-processing such as printing is described is, e.g., PostScript (registered trademark) and Portable Data Format (PDF (ISO 32000-1)). Finally generated image data of each page is image data of the format operable by the print engine 140, typically, bitmap image data. The print document data 200 is sent from a client computer to the host CPU 100 via a data communication path such as a local area network (LAN), the drawing of which is omitted. The host CPU 100 performs processing for the generation of image data of each page, controls a RIP accelerator 130 therefor, and performs a print control operation of supplying the generated image data to the print engine 140 and printing the supplied image data, and so on. The host CPU 100 implements such functions by executing control programs stored in a storage unit (not shown), e.g., a read-only memory (ROM), an electronically erasable programmable ROM (EEPROM), and a hard disk. The detailed functions implemented by the host CPU 100 are described below.

A memory 120 is a hardware device providing a work storage area to be used when the host CPU 100 performs the processing. The memory 120 is configured by, e.g., a random access memory (RAM). The memory 120 is used to temporarily store image data of each page generated by the host CPU 100 and control information for various control operations.

The RIP accelerator 130 is a hardware device for performing specific image processing in a process of generating image data from the print document data 200 by the host CPU 100. The "specific image processing" to be performed by the RIP accelerator 130 is, e.g., the compression/decompression of image data, the expansion/reduction, and the rotation of an image, color space conversion, and halftoning (or error diffusion). Apparently, the "specific image processing" is not limited to one of these types of processing and includes multiple image processing of performing two or more of these types of processing in a predetermined order. The RIP accelerator 130 may perform image processing other than the above exemplary types of processing. Image data handled by the RIP accelerator 130 is not limited to that of the bitmap type. Image data of Joint Photographic Experts Group (JPEG) type and other formats may be used as that handled by the RIP accelerator 130. A hardware circuit performs such "specific image processing" faster than software does. Thus, the host CPU 100 requests the RIP accelerator 130 to perform the above specific image processing out of a process (referred to as a raster image processing (RIP) process) of generating image data of each page from the print document data 200.

The RIP accelerator 130 includes N (N is an integer equal to or more than 2) of dynamically reconfigurable processors (DRPs) 132-1, 132-2 . . . 132-N (hereinafter generically referred to as DRP 132, if it is unnecessary to distinguish the DRPs from one another).

The DRP 132 is a processor whose internal circuit configuration is dynamically reconfigurable (e.g., reconfigurable within 1 clock). For example, a digital application processor/distributed network architecture (DAPDNA) processor introduced by JP-A-2009-3765 may be used as the DRP 132 (however, the DRP 132 is not limited thereto). The DRP 132 of this architecture has plural of circuit elements (processor elements (PEs)) for configuring a logical circuit, and wiring resources configuring the connections among the PEs. The DRP 132 may operate as logic circuits of various configurations by changing the setting of the PEs and the connection configuration among the PEs. The DRP 132 has plural of configuration memories. Each single configuration memory stores configuration data defining an associated single configuration. The term "configurations" is used to mean logic circuits that are simultaneously present on a single DRP 132. When one of plural of configuration memories is made effective (active), the setting of the PEs and the recombination of the interconnections among the PEs are performed according to data stored in the activated-memory. Consequently, a circuit of the configuration corresponding to the activated-memory is configured. At a point in time, only one configuration memory is active. The configuration of the DRP 132 is switched by activating another configuration memory. For example, pipeline processing using a series of configurations may be implemented by preliminarily loading, into different configuration memories, configuration data to be switched and then activating the configuration data in sequence. Time required to load configuration data into configuration memories may be reduced by loading configuration data into one of the configuration memories while loading configuration data into a different one of the configuration memories.

The N DRPs 132 perform the same image processing. That is, the N DRPs 132 may perform the same image processing in parallel with one another. The number N of the DRPs 132 is a total number of DRPs 132 allocatable to the "specific image processing". That is, even when (N+k) DRPs 132 are mounted in the RIP accelerator 130 (k is an integer larger than 1) and the k DRPs 132 are reserved for processing other than the "specific image processing", the number of the DRPs 132 allocatable to the "specific image processing" is N.

Each DRP 132 performs a series of image processing steps, e.g., JPEG decompression processing of a JPEG-compressed image object in the print document data 200, the processing of reducing the size of a bitmap image obtained by the decompression processing into a predetermined image size, the processing of performing color space conversion on a resultant image of reducing the size, the processing of binarizing a resultant image of the color space conversion by error diffusion, lossless compression processing of a resultant image of the binarization in order to temporarily store the image until subsequent processing is performed, and the like. That is, each DRP 132 performs the series of image processing steps in sequence while changing, when performing each image processing step, the configuration thereof itself to a configuration for performing the image processing step.

Individual image processing steps (e.g., image processing steps to be performed in units of pages or objects) requested from the host CPU 100 to be performed are allocated to any of the N DRPs 132, respectively. Then, the N DRPs 132 perform the image processing steps on different pages or objects, respectively. Thus, parallel processing is implemented. The RIP accelerator 130 may be configured such that a total of N DRP chips are mounted on a single board or plural of boards.

In this case, the apparatus configuration illustrated in FIG. 1 is implemented by connecting each board to a slot on a mother board on which the host CPU 100 is mounted.

The print engine 140 prints image data of each page supplied from the host CPU 100 on a sheet-like medium such as paper.

Next, an example of a functional configuration implemented by the host CPU 100 is described hereinafter. In the example illustrated in FIG. 1, the host CPU 100 includes a PDL interpreting portion 102, a memory/input-output (IO) control portion 104, a DRP control portion 106, an object/page information extracting portion 108, a dynamic scheduler 110, and a DRP status register 112 as functional modules. The PDL interpreting portion 102 is a functional module for interpreting print document data 200 described in a PDL and for "drawing" an image on the memory. The interpreting portion 102 is called an "interpreter" or "decomposer". The memory/IO control portion 104 is a functional module for controlling the input/output of data among the memory 120 and peripheral apparatuses such as the print engine 140. The DRP control portion 106 is a functional module for controlling and causing the RIP accelerator 130 to perform image processing. According to the allocation of pages or objects to the DRPs 132, which is determined by the dynamic scheduler 110, the DRP control portion 106 requests each DRP 132 of the RIP accelerator 130 to perform image processing on a page or an object.

The object/page information extracting portion 108 extracts information concerning each page and each object contained in each page, which are obtained by the interpretation of the print document data 200 by the PDL interpreting portion 102, and generates an object table.

FIG. 2 illustrates an example of data contents of the object table. In the example illustrated in FIG. 2, the object table includes the number of each page, and information concerning each object contained in each page. In the example illustrated in FIG. 2, the information concerning each object includes the data size of each object, an estimated value of time ("ESTIMATED NECESSARY TIME") required to process each object by the DRP 132, and a result of comparison between the data size of each object and a predetermined threshold ("COMPARISON OF SIZE TO THRESHOLD"). Time required to process one object with one of the objects configured on the DRP 132 is calculated by multiplying time (latency) required to process one pixel by the data size of the object and dividing a resultant value by the frequency of an operation clock of the DRP 132.

The "DATA SIZE" of each object represents a value of a data size of an image when the object, e.g., when the object is developed into a bitmap image. A description of an object contained in the print document data 200 includes information concerning the data size of the object (e.g., an image object (to be described below)). Thus, it is sufficient to register this information in the object table. Regarding an object of the type other than an image object, the data size of the bitmap image into which the former object is developed may be obtained, e.g., when a PDL is interpreted.

The "ESTIMATED NECESSARY TIME" is time required to sequentially reconfigure the configurations of the DRPs 132 into those for performing the "specific image processing" and to process the object by the DRPs 132 respectively having the reconfigured configurations in sequence. Thus, the "ESTIMATED NECESSARY TIME" is obtained by calculating a sum of amounts of time, which are respectively required by the individual DRPs 132 having the reconfigured configurations to process the object.

The object is data representing a bunch of images arranged in a page. The object is, e.g., an image object (e.g., a bitmap image representing a continuous tone image such as a photograph, and a compressed image), a graphic object (e.g., a graphic generated in vector representation), a font object, and a background object (representing the image pattern of a background). Particularly, the image object is usually large in amount of data, as compared with other types of objects. The image object often needs to be subjected to many types of processing, such as decompression-processing, halftoning, and recompression-processing. Thus, when RIP is performed, a load due to image processing is large. Accordingly, in the present exemplary embodiment, image processing which imposes a large load is implemented through hardware processing by the RIP accelerator 130. An image object has been exemplified as an object of the type that the RIP accelerator 130 is requested to process. However, apparently, an object of another type may be added to objects to be subjected to the image processing.

In the object table illustrated in FIG. 2, information concerning each object of the type to be subjected to image processing which the RIP accelerator 130 is requested to perform is registered. That is, if an object contained in each page of the print document data 200 is not of the type which the RIP accelerator 130 is requested to perform, information concerning such an object is not registered in the object table.

The column "COMPARISON OF SIZE TO THRESHOLD" of the object table represents binary flag data set to have a value of "1" if the data size of the object is larger than a predetermined threshold, and to have a value of "0" if the data size of the object is smaller than the predetermined threshold. Even if the object is of the type to be subjected to the image processing which the RIP accelerator 130 is requested to perform, and if the data size of the object is small, it is noted, in consideration of a request to the RIP accelerator 130 and the like, that the image processing may be faster performed on the object by causing the host CPU 100 to perform software processing. Accordingly, the RIP accelerator 130 is not requested to perform the image processing on the object whose data size is equal to or smaller than the threshold (the value of the "COMPARISON OF SIZE TO THRESHOLD"="0").

A DRP status register 112 is a register that holds a current status (usage state) of each DRP 132 in the RIP accelerator 130. FIG. 3 illustrates an example of data held by the DRP register 112. In this example, the register 112 holds information concerning each DRP corresponding to and mounted on each server (the RIP accelerator 130). Information concerning the individual DRPs 132 includes the identification number ("DRP#"), the status, and the priority ("job priority") of each the DRPs 132. The status has a value "In Use" (i.e., "Full" indicating that image processing or another processing requested by the host CPU 100 is being performed) or a value "Unused" (i.e., "Ready" indicating that processing requested by the host CPU 100 is not performed, and that the associated DRP 132 may accept a request). When allocating processing to a "Ready" DRP 132, the host CPU 100 changes the status of this DRP 132 to "In Use". When receiving from this DRP 132 a notification indicating the completion of the processing, the host CPU 100 changes the status of this DRP 132 to "Unused". The "job priority" is a value indicating the order of priority of the DRP 132 to which a job (i.e., image processing) is allocated. When allocating image processing of a page or object to one of the DRPs 132, the dynamic scheduler 110 allocates the image processing to the DRP having the smallest value of the job priority. When allocating the image processing to one of the DRPs 132, the dynamic scheduler 110 changes the status of this DRP 132 to "In Use". In addition, the job scheduler 110 changes the value of the job priority of this DRP 132 to that of the lowest order of priority, and raises the value of the job priority of each of the other DRPs by 1.

FIG. 3 illustrates the example of the data in the case of the RIP accelerator 130 having five DRPs 132. However, the number of the DRPs 132 that the RIP accelerator 130 has is not limited thereto.

The dynamic scheduler 110 performs a scheduling process of allocating, to each of the DRPs 132, the image processing of each object which is included in the print document data 200 and of the type to be requested and has a comparison-of-size-to-threshold value of 1. The dynamic scheduler 110 has the functions of allocating objects to each of the DRPs 132 in units of pages (i.e., collectively allocating a group of objects existing in 1 page to one of the DRPs 132) and allocating objects to each of the DRPs 132 in units of objects (i.e., allocating each object to one of the DRPs 132).

The dynamic scheduler 110 divides the print document data 200 sequentially from the first page into "sections" including pages of the number equal to the number N of the DRPs 132 to which the "specific image processing" of data is allocatable. The dynamic scheduler 110 dynamically changes the units in which the image processing of data is allocated to the group of the DRPs 132, between pages and objects in each section.

When a section is allocated to each of the DRPs 132 in units of pages, 1 page is allocated to a single DRP 132, because each of the number of pages in the section and the number of the DRPs 132 is equal to N. That is, in this case, the N DRPs 132 process N pages in parallel. This system is called "page-based parallel system". The processing is performed in units of sections. Thus, until the DRP 132 allocated to the most time-consuming one (i.e., the largest-size one) of N pages finishes the processing, even if each of the other DRPs 132 has completed the processing of the page allocated thereto, the next page or object is not allocated to the latter DRPs 132.

When a section is allocated to the DRPs 132 in units of objects, objects of each page are respectively allocated to the DRPs 132 according to the present exemplary embodiment. If the number of objects contained in 1 page is less than N, no object (which is of the type to be requested and has a data size equal to or larger than a threshold (hereinafter, unless otherwise noted, the "object" is defined to satisfy such conditions)) contained in another page is allocated to an unused DRP 132 according to the present exemplary embodiment. That is, each of the N DRPs 132 does not process an object contained in a different page. Each time when all the N DRPs 132 finish the image processing of 1 page in a section, objects contained in the next page are respectively allocated to the DRPs 132. If the number of objects contained in 1 page is larger than N, first N objects are respectively allocated to the N DRPs 132. Then, the remaining objects are allocated to the DRPs 132 in the order of finishing the image processing of the object. A maximum of N of the DRPs 132 provided on the RIP accelerator 130 operate in parallel to one another. Such a parallel method is assumed to be called a "paginal-object-based parallel method."

The dynamic scheduler 110 changes a method of allocating to the DRPs 132 a group of objects contained in the print document data between the page-based parallel method and the paginal-object-based parallel method at every section by referring to an object table generated by the object-page information extracting portion 108.

The DRP control portion 106 allocates processing of data to each DRP 132 in units of pages or objects in each page according to the parallel method determined by the dynamic scheduler 110 corresponding to each section. For example, when allocating processing of data to the DRPs 132 in units of pages, the DRP control portion 106 notifies the associated DRP 132 of the identification information of each page (the identification information of each page may be information representing a storage address of image data thereof). When receiving the notification, the DRP 132 acquires image data of each object contained in the page stored in, e.g., the memory 120, using the identification information of the page. Then, the DRPs 132 perform image processing on the data of objects sequentially. When allocating processing of data to the DRPs 132 in units of objects, the DRP control portion 106 notifies the associated DRP 132 of the identification information of each object. When receiving the notification, the DRP 132 acquires image data of the object stored in, e.g., the memory 120, using the identification information of the object. Then, the DRP 132 performs image processing on the image data of the object. In the foregoing description, an example of a method (pull-method) has been described, in which the SDRP 132 acquires image data of each object to be processed. Apparently, instead of this method, a method (push-method) may be used, in which the DRP control portion 106 transfers image data of a page or object to be allocated to the DRP 132.

Figure 4:
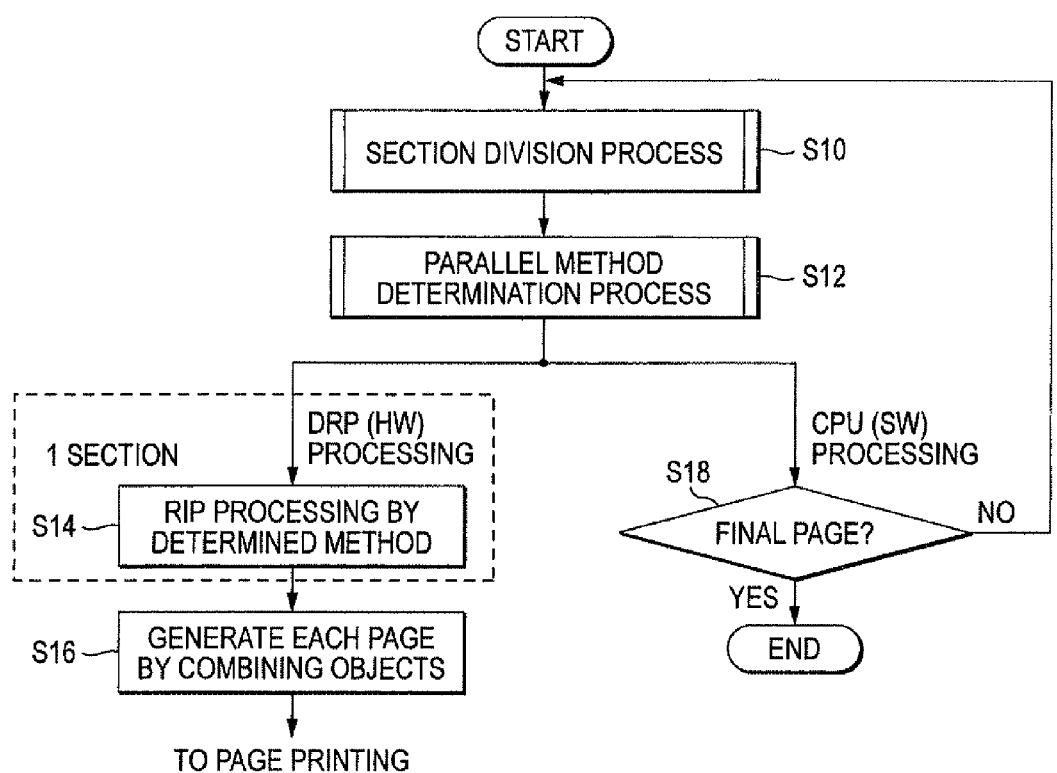
FIG. 4 is a flowchart illustrating an example of the entire procedure of a dynamic scheduler.

Next, referring to FIG. 4, an example of a general procedure to be performed by the host CPU 100 (particularly, the dynamic scheduler 110 and the DRP control portion 106) is described hereinafter.

In this procedure, in step S10, the dynamic scheduler 110 divides the print document data 200 and extracts each single section (i.e., N pages) sequentially from a first page of the print document data. In step S12, the dynamic scheduler 110 determines which of the parallel methods, i.e., the page-based parallel method or the paginal-object-based parallel method is employed. When the parallel method to be employed is determined, in step S14, according to the determined parallel method, the DRP control portion 106 allocates a page or an object to each DRP 132 and causes the DRPs 132 to perform parallel processing. Each DRP 132 performs the "specific image processing" on image data of each object contained in the page allocated thereto (if the parallel method is employed) or of the object allocated thereto (if the paginal-object-based parallel method is employed). Then, each DRP 132 returns a result of the processing to the host PC 100. In step S16, the host CPU 100 generates image data of each page by incorporating a result of processing each object by each DRP 132 through software processing into an image of an associated page. The generated image data of each page is supplied to the print engine 140 (after once buffered in the storage apparatus, if necessary).

In step S18, the dynamic scheduler 110 determines, in parallel with hardware processing performed in step S14, whether a currently extracted page reaches the final page of the print document data 200. If the currently extracted page does not reach the final page, in step S10, the dynamic scheduler 110 extracts the next section. Then, in step S12, the dynamic scheduler 110 determines the parallel method to be applied to the section. Thus, according to this exemplary embodiment, the host CPU 100 concurrently performs processing such as preparation for the next section while the RIP accelerator 130 performs image processing.

Figure 5:
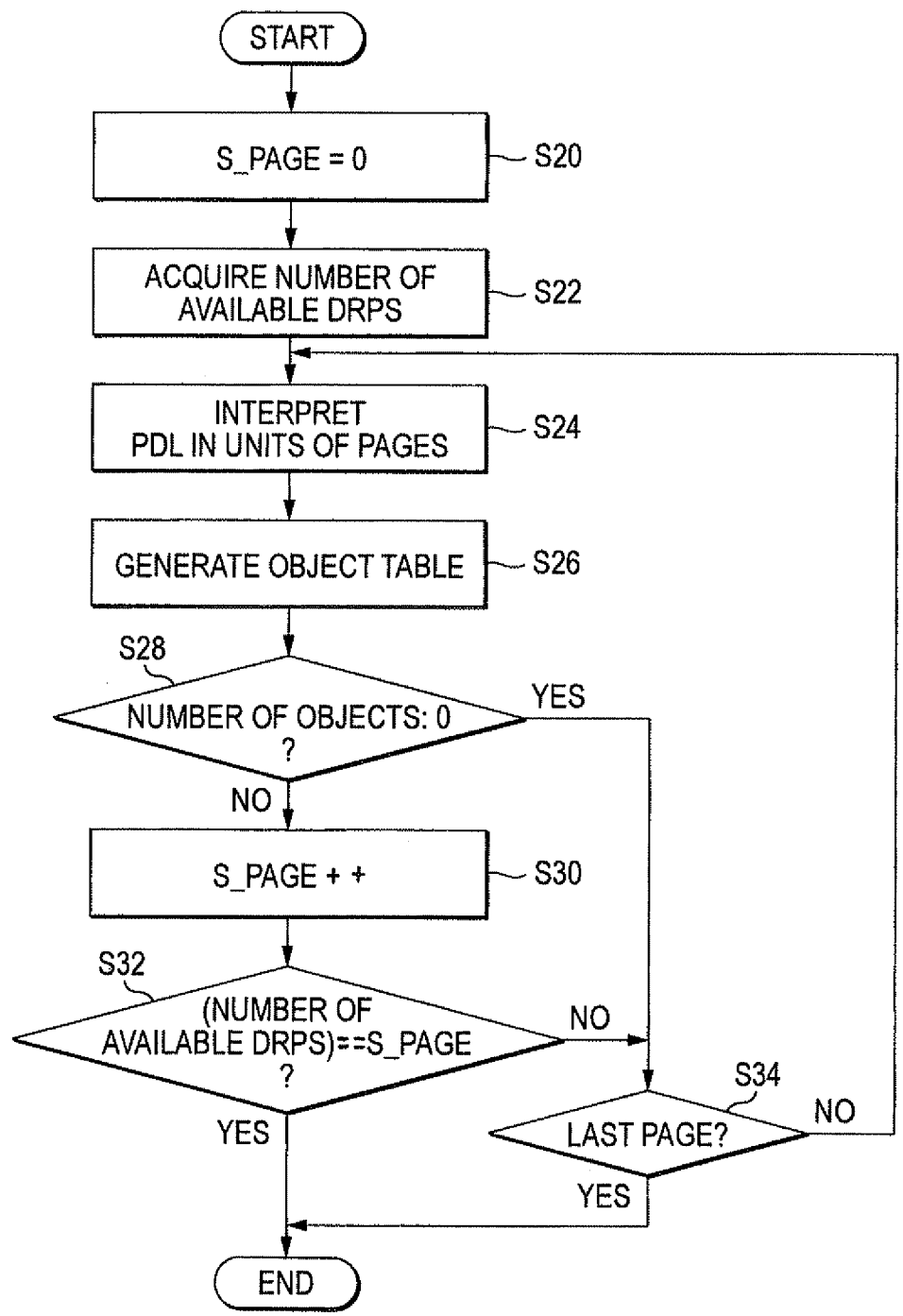
FIG. 5 is a flowchart illustrating an example of the procedure of a section division process.

FIG. 5 illustrates an example of the detailed procedure of the section division process (step S10). In this example, first, in step S20, the dynamic scheduler 110 initializes a control variable S_PAGE. The variable S_PAGE represents the number of pages incorporated into the section this time. In step S22, the dynamic scheduler 110 acquires the number of DRPs 132 available for the "specific image processing" among the RIP accelerators 130. This number is obtained by subtracting the number of DRPs 132 reserved for processing other than the "specific image processing" from a total number of the DRPs 132 in the RIP accelerator 130. The number DRPs 132 available for the "specific image processing" (or the number of DRPs 132 reserved for processing other than the "specific image processing") is preliminarily set as setting-information in a nonvolatile storage device. In step S22, the dynamic scheduler 110 refers to the setting information. Next, in step S24, the PDL interpreting portion 102 interprets print document data in units of pages. Then, in step S26, information concerning each object (of the type that the RIP accelerator 130 is requested to process) is registered in the object table refer to FIG. 2. If there is no objects which are of the type that the RIP accelerator 130 is requested to process and which have data sizes equal to or larger than a threshold (i.e., the "comparison-of-size-to-threshold value" is 1) in the page (i.e., a result of determination in step S28 is "Yes"), in step S34, the dynamic scheduler 110 determines whether a current page of the print document data to be interpreted reaches the last page thereof. If the current page of the print document data to be interpreted does not reach the last page, the dynamic scheduler 110 returns to step S24. Then, the dynamic scheduler 110 pursues the processing of the next page.

If the dynamic scheduler 110 determines, in step S28, that one or more objects which are of the type to be requested to the RIP accelerator 130 to process and have data sizes equal to or larger than a threshold are present in the page, in step S30, 1 is added to the control variable S_PAGE. In step S32, the dynamic scheduler 110 determines whether the value of the variable S_PAGE to which 1 is added is equal to the number of available DRPs, which is acquired in step S22. If a result of this determination is "Yes", pages of the number equal to that of the number of the available DRPs 132 (incidentally, the pages are limited to those having objects to be requested to the DRP to process) are counted. Thus, the process is finished by regarding the N pages as 1 section. If the result of the determination in step S32 is "No", in step S34, the dynamic scheduler 110 determines whether the current page of the print document data to be interpreted reaches the last page. If the current page of the print document data to be interpreted does not reach the last page, the dynamic scheduler 110 returns to step S24. Then, the dynamic scheduler 110 pursues the processing of the next page. If the dynamic scheduler 110 determines, in step S34, that the current page of the print document data to be interpreted reaches the last page, the dynamic scheduler 110 finishes the process by regarding the current number of pages, which is less than N, as 1 section, though the number of pages incorporated into the section is less than N.

Figure 6:
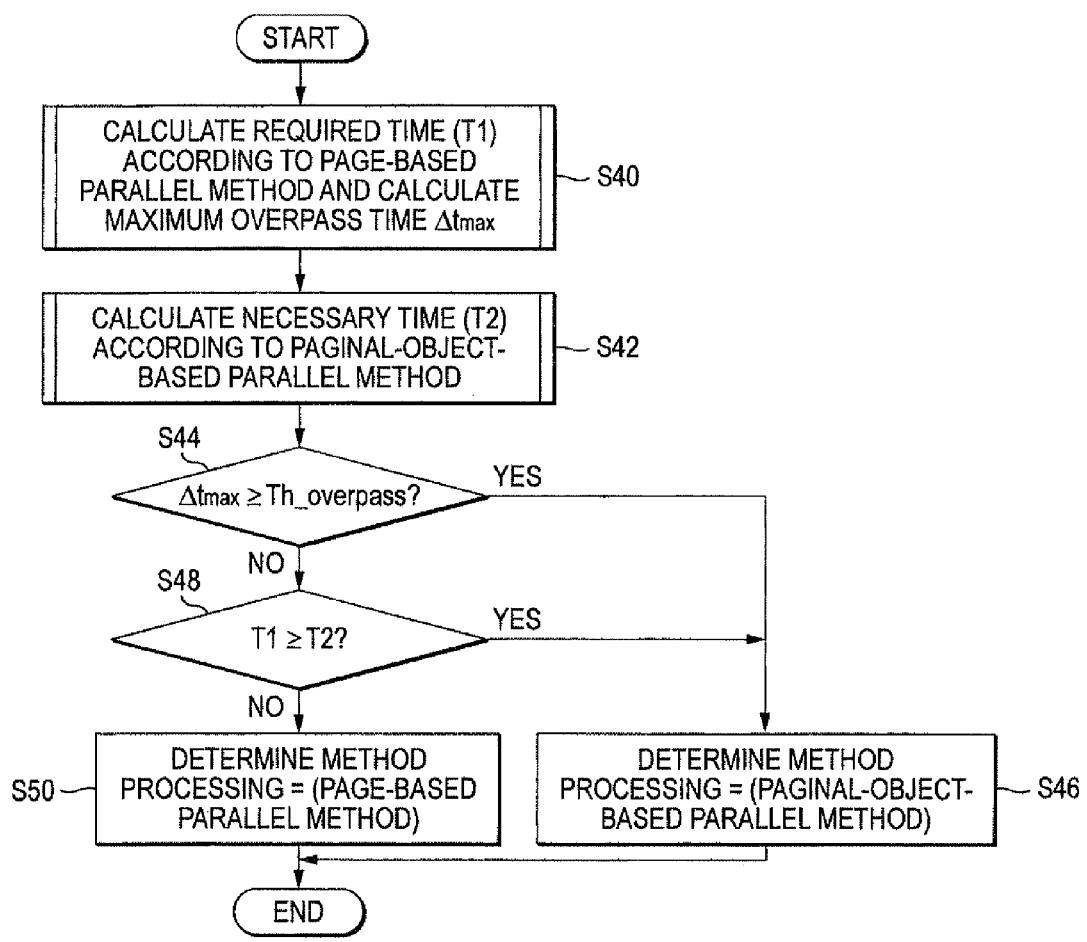
FIG. 6 is a flowchart illustrating an example of the procedure of a parallel determination process.

Next, a general procedure for performing the parallel method determination process in step S12 is described hereinafter with reference to FIG. 6. In this procedure, in step S40, the dynamic scheduler 110 estimates a time T1 required to complete image processing of all pages of a section since the start of the image processing of the section. In step S40, in addition, the dynamic scheduler 110 calculates a maximum value $\Delta t_{max}$ of an overpass time in a case where the completion of image processing of a later page of each section overtakes that of image processing of an earlier page thereof (i.e., the image processing of a later page is completed earlier than that of an earlier page). For example, an estimated necessary time taken to complete image processing of each of second and later pages of the section in the DRP 132 to which the current page is allocated is subtracted from that to complete image processing of each of pages earlier than the current page. The maximum value of results of the subtraction is set to be the maximum overpass time of the current page. In addition, the maximum value of the maximum overpass times of second to Nth pages is set to be the maximum value $\Delta t_{max}$ of the overpass time. If the maximum value $\Delta t_{max}$ is a negative value, the completion of image processing of each of pages later than the current page does not overtake that of image processing of each of pages earlier than the current page. A detailed example of processing in step S40 is described below with reference to FIG. 7.

In step S42, the dynamic scheduler 110 estimates a time T2 taken from the start of image processing a current section to the completion of image processing of all pages in the case of causing the DRPs 132 to process the current section in units of pages in parallel with one another according to the paginal-object-based parallel method. A detailed example of processing in step S42 is described below with reference to FIG. 8.

Incidentally, either of processing in step S40 and that in step S42 may be performed earlier.

Next, in step S44, the dynamic scheduler 110 determines whether the maximum overpass time $\Delta t_{max}$ obtained in step S40 is larger than a predetermined positive threshold Th_overpass. The threshold Th_overpass indicates a permissible amount of the overpass of the completion of image processing of an earlier page in a section by that of image processing of a later page in the section. If the image processing of a later page in a section is completed earlier than that of an earlier page in the section by an amount larger than the threshold, it is necessary for printing results of printing in the order of pages to cause the image processing of a later page to greatly wait. This hinders smooth processing. Accordingly, in step S46, the present exemplary embodiment forcibly employs the paginal-object-based parallel method regardless of the magnitude relationship between the times T1 and T2 required to process a section if the dynamic scheduler 110 determines, in step S44, that the value $\Delta t_{max}$ is equal to or more than the threshold Th_overpass. Consequently, occurrence of an excessive overpass in the case of using the page-based parallel method may be prevented.

If the dynamic scheduler 110 determines, in step S44, that the value $\Delta t_{max}$ is less than the threshold Th_overpass, in step S48, the dynamic scheduler 110 compares the times T1 and t2 required to process a section, which respectively correspond to the parallel methods. Then, in step S46, the dynamic scheduler 110 employs one of the parallel methods, which takes a shorter required time than the other parallel method. That is, if the time T1 is equal to or longer than the time T2, in step S46, the dynamic scheduler 110 employs the paginal-object-based parallel method corresponding to the time T2. Otherwise, in step S50, the dynamic scheduler 110 employs the page-based parallel method corresponding to the time T1.

Figure 7:
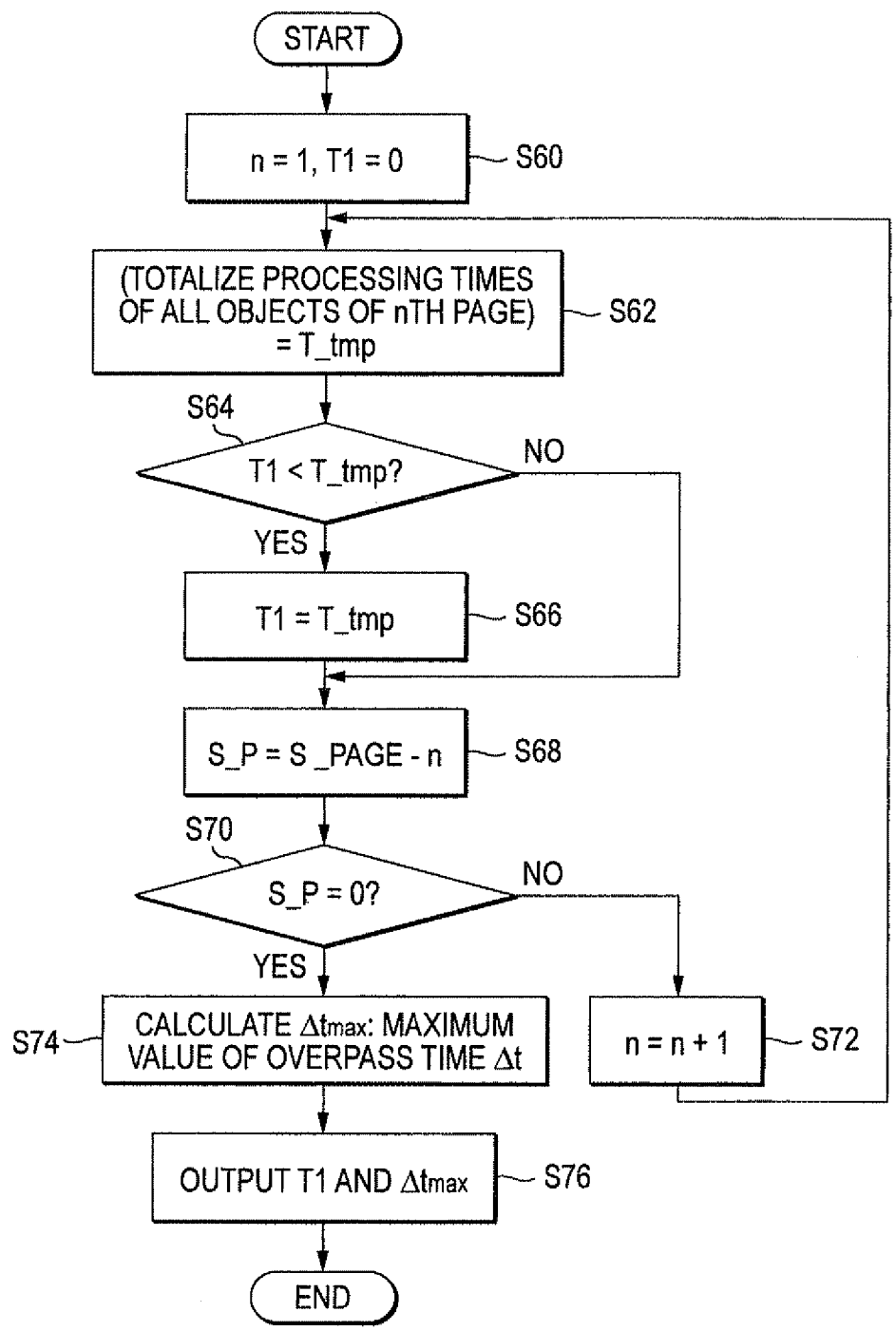
FIG. 7 is a flowchart illustrating an example of the procedure for calculation of a necessary time per section of a page-based parallel method to be performed in units of sections.

Next, a detailed example of the procedure to be performed in step S40 is described with reference to FIG. 7. In this example, first, in step S60, control variables "n" and T1 are initialized to 1 and 0, respectively. The variable "n" designates a page number of a page in a section. Next, in step S62, an estimated necessary time required to perform image processing of all objects contained in an nth page of the section is summed up. An estimated necessary time taken to perform image processing of each object of each page may be obtained from the object table exemplified in FIG. 2. Thus, in step S62, it is sufficient to sum up the estimated necessary times respectively corresponding to objects. If a total value T_tmp of the estimated necessary times is larger than T1 (Yes in step S64), in step S66, the value of T_tmp is substituted into the variable T1. If the total value T_tmp is equal or less than T1 (a result of the determination in step S64 is No), step S66 is skipped. Next, in step S70, the dynamic scheduler 110 determines whether a value S_P obtained as a result of subtracting the variable "n" from the variable S_PAGE in step S68 reaches 0 (i.e., whether checks of all pages the number of which is S_PAGE are performed). If the value S_P does not reach 0, in step S72, the variable "n" is increased by 1. A process of processing of the next page in steps later than step S62 is repeated. In the case of the page-based parallel method, pages of a section are allocated one-on-one to the N DRPs 132, respectively. Thus, a necessary time taken to process the entire section is equal to an estimated necessary time taken to perform the image processing on a page having a maximum data size among the pages of the section. A loop including steps S62 to S72 is repeatedly performed on all pages. Thus, the estimated necessary time corresponding to the page which takes a longest processing time among the pages of the section is substituted into the variable T1 and equivalent to the estimated necessary time corresponding to the current section.

If the dynamic scheduler 110 determines, in step S70, that the value S_P reaches 0, this means that all pages of the current section have been checked. In this case, in step S74, the dynamic scheduler 110 calculates the maximum overpass time $\Delta t_{max}$ from the estimated necessary time corresponding to each page of the current section. Then, in step S76, the dynamic scheduler 110 outputs the values of the maximum overpass time $\Delta t_{max}$ and the estimated necessary time T1 corresponding to the current section.

Figure 8:
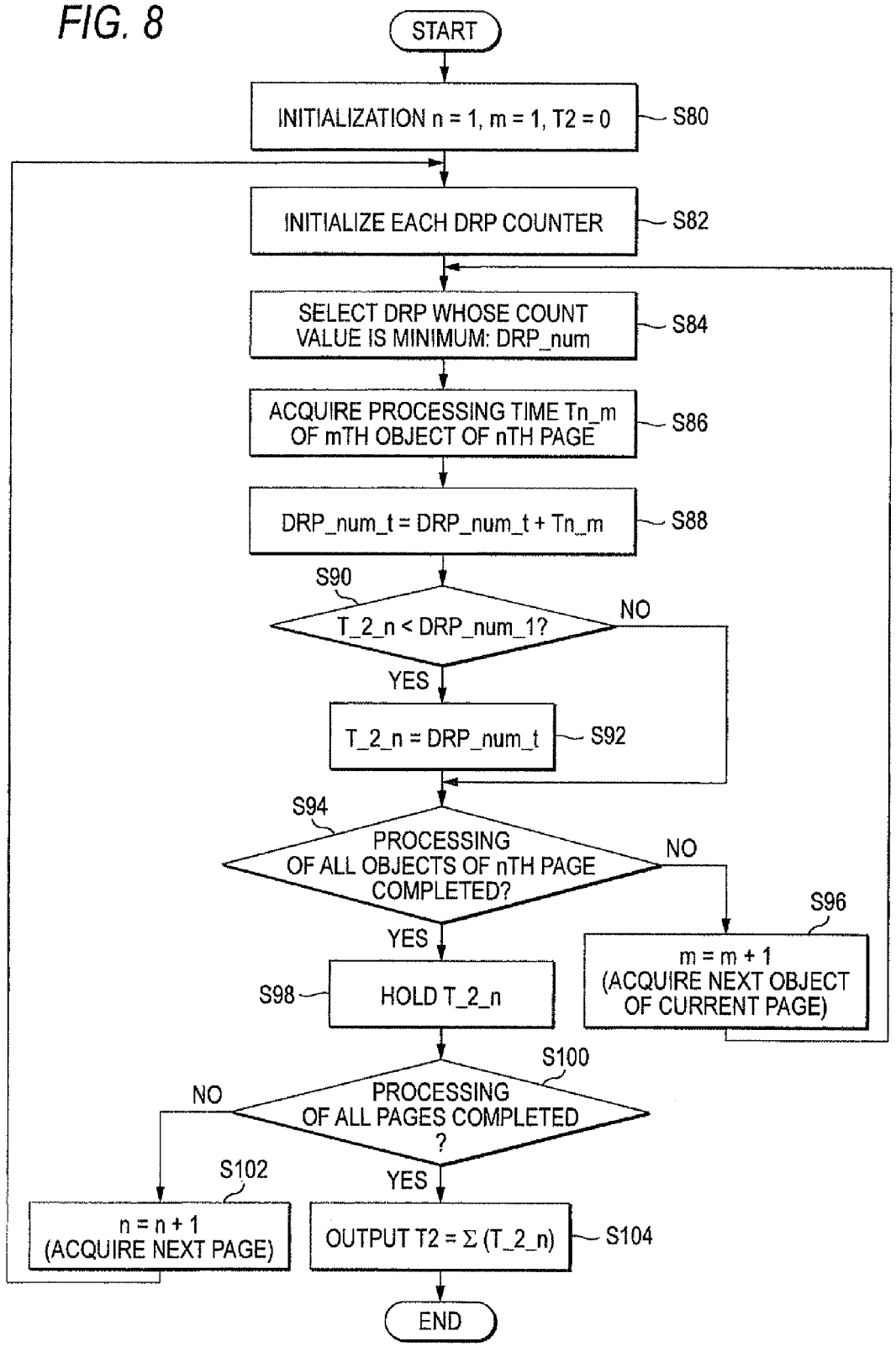
FIG. 8 is a flowchart illustrating an example of the procedure for calculation of a necessary time per section of a paginal-object-based parallel method to be performed on each page.

Next, an example of the detailed process procedure in step S42 is described with reference to FIG. 8. In this example, in step S80, the dynamic scheduler 110 initializes the control variables "n", "m", and T2 to 1, 1, and 0, respectively. The variable "n" represents a page number of each page contained in the section. The variable "m" represents an object number of each object contained in 1 page. Although the drawing of a paginal-object-based maximum processing time T_2_n is omitted, in step S80, the paginal-object-based maximum processing time T_2_n is initialized to 0. The paginal-object-based maximum processing time T_2_n is a variable representing the processing time of a DRP 132 which performs processing in the longest time when a group of objects of an nth page are processed in parallel by the N DRPs 132. Next, in step S82, the value of each DRP counter "DRP_Num_t" is initialized to 0.

Each DRP counter "DRP_Num_t" is a variable for holding a total of estimated necessary times respectively corresponding to objects allocated to an Num-th one (DRP_Num) of the N DRPs 132, the number of which is equal to or more than 0, in the RIP accelerator 130. Next, in step S84, the dynamic scheduler 110 selects a DRP 132 (assumed to be the DRP_Num), the DRP counter DRP_num_t corresponding to which has a minimum value, as a target to which an m-th object of an nth page is allocated. Then, in step S86, the dynamic scheduler 110 reads the estimated necessary time Tn_m of the m-th object of the nth page from the object table (see FIG. 2). In step S88, the dynamic scheduler 110 adds the estimated necessary time Tn_m to a total processing time DRP_num_t of the DRP 132 (DRP_num) selected in step S84. If the total processing time DRP_num_t is larger than the maximum processing time T_2_n after the addition (a result of the determination in step S90 is Yes), in step S92, the value of the total processing time DRP_num_t is substituted into the maximum processing time T_2_n. That is, by the addition of S88, the total processing time of the DRP_num becomes the longest among those of the N DRPs 132, the value of the maximum processing time T_2_n is replaced with the longest value. On the other hand, if the total processing time DRP_num_t is equal to or smaller than the maximum processing time T_2_n after the addition (a result of the determination in step S90 is No), step S92 is skipped. Then, in step S94, the dynamic scheduler 110 determines whether processing is completed up to the last object of the nth page in the object table. If the processing is not completed thereto, in step S96, the object number m is increased by 1. Then, the processing in steps S84 and later is repeated using the next page as a processing target.

If the dynamic scheduler 110 determines that the processing is completed up to the last object of the nth page, in step S98, the value of the maximum processing time T_2_n at that point in time is held as a time required to perform parallel processing of the nth page of the current section. Then, in step S100, the dynamic scheduler 110 determines whether the processing is completed on all pages of the current section. If there is an unprocessed page, in step S102, the page number is increased by 1. In addition, the processing in step S82 and later steps is repeatedly performed thereon. It the dynamic scheduler 110 determines, in step S100, that the processing is completed on all pages of the current section, in step S104, the dynamic scheduler 110 performs the summation of the processing times T_2_n respectively corresponding to pages held therein over all the pages and outputs the total-sum of the processing times as T2.

Thus, an example of the procedure of the host CPU 100 including the dynamic scheduler 110 has been described with reference to FIGS. 4 to 8. However, the procedure described in the flowcharts is only an example. Apparently, any other procedures may be used, as long as similar results of processing may be obtained by such procedures.

Next, a manner of progress of image processing according to the page-based parallel method, and that of progress of image processing according to the paginal-object-based parallel method are described with reference to FIGS. 9 and 10, respectively. It is assumed that in each of FIGS. 9 and 10, a lateral direction represents the direction of the lapse of time, and that time passes in a direction from the left to the right, as viewed in each of FIGS. 9 and 10. Each of FIGS. 9 and 10 illustrates an example of parallel processing performed by four DRPs.

Figure 9:
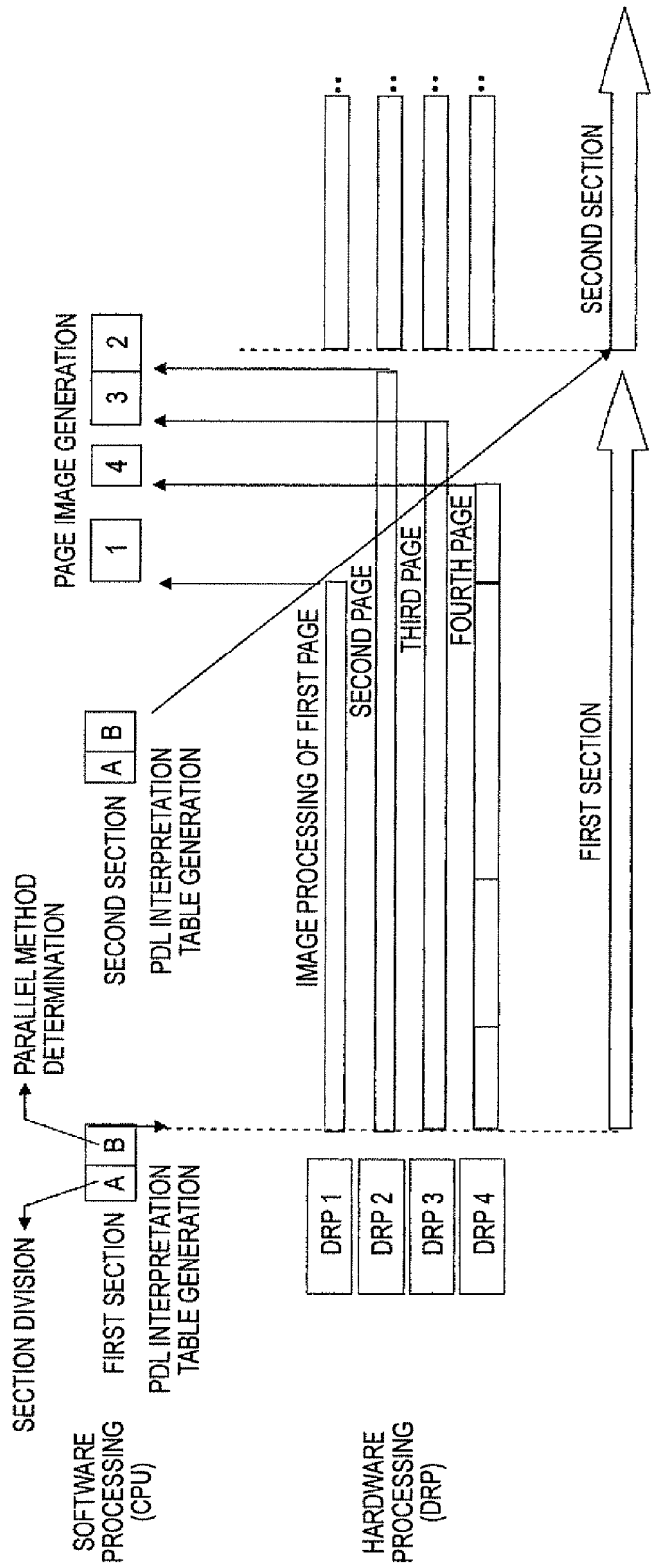
FIG. 9 is a diagram illustrating how to progress the processing of a page group according to the page-based parallel method to be performed in units of sections.
Figure 10:
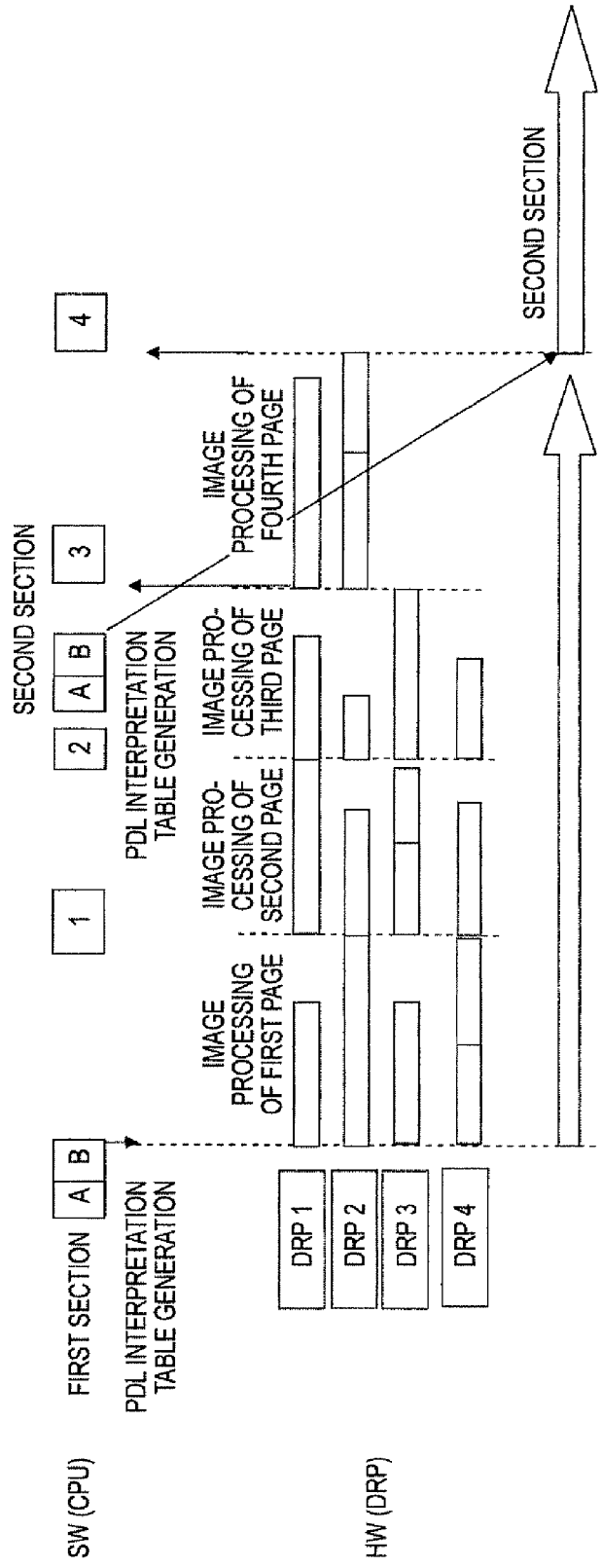
FIG. 10 is a diagram illustrating how to progress the processing of a page group according to the paginal-object-based parallel method to be performed on each page.

FIG. 9 illustrates a manner of progress of image processing according to the page-based parallel method. First, the progress of image processing is described in sequence along the lapse of time from the left to the right, as viewed in FIG. 9. When RIP processing of print document data is started, first, PDL interpretation, the generation of an object table, and the extraction of a first section are performed in a section division process A (see step S10 illustrated in FIG. 4, and FIG. 5) by software (SW) processing. In this example, because four DRPs are used, first to fourth pages are extracted as the first section. Then, a parallel method determination process B (see step S12 illustrated in FIG. 4, and FIG. 6) is performed on a section divided from the data. In this example, the parallel method is assumed to be determined as the page-based parallel method. As a result, the DRP control portion 106 allocates, to the four DRPs 1 to 4, image processing of the first page, that of the second page, that of the third page, and that of the fourth page, respectively, in this order. The DRPs 1 to 4 perform parallel processing on the allocated pages. In parallel with the image processing performed by the hardware (HW) processing by the DRPs 1 to 4, the host CPU 100 extracts a second section by carrying on the section division A, and performs the parallel method determination B on the second section.

Another system may be considered, in which the parallel processing by the DRPs 1 to 4 is started after the parallel method to be performed on each of all sections of the print document data. However, according to this system, image processing and printing are not started until the parallel method corresponding to each of all the sections is determined. In contrast, according to the present exemplary embodiment, the parallel method is determined corresponding to one section in sequence, as exemplified in FIG. 9. Thus, when the parallel method corresponding to the first section is determined, image processing of the first section is started, even though the DRPs 1 to 4 do not wait for completion of determining the parallel methods respectively corresponding to all sections. In addition, the parallel method corresponding to each of the second section and later sections is determined while the DRPs 1 to 4 perform image processing on a just-preceding section. Thus, time required to perform processing for determining the parallel methods may substantially be saved in order to perform processing in a background.

According to the example illustrated in FIG. 9, pages arranged in the ascending order of the data sizes of the objects contained in the pages of a section are a first page, a fourth page, a third page, and a second page. Thus, the DRPs complete the image processing of the first page, that of the fourth page, that of the third page, and that of the second page in this order. According to this example, the completion of the image processing of the third page overtakes that of the image processing of the second page. The completion of the image processing of the fourth page overtakes that of the image processing of the second page, and that of the image processing of the third page. Particularly, an overpass time by which the completion of the image processing of the fourth page overtakes that of the image processing of the second page is the maximum overpass time $\Delta t_{max}$. According to this example, the maximum overpass time $\Delta t_{max}$ is assumed to be equal to or less than the threshold that is an overpass permissible amount. The host CPU 100 generates images of the pages in the order of completion of the image processing thereof, using resultant data of the image processing, and causes a buffer to temporarily store the generated image. Then, the stored images of the pages are supplied to the print engine 140 in the order of pages.

FIG. 10 illustrates a manner of progress of image processing according to the paginal-object-based parallel method. In the case of this example, when RIP processing of the print document data is started, first, the host CPU 100 (the dynamic scheduler 110) extracts a first section by performing the section division A by software (SW) processing. According to this example, pages of the number corresponding to the number of the DRPs, i.e., the first page to the fourth page are extracted as 1 section. Then, the paginal-object-based parallel method is employed in this example by the parallel method determination process B performed on the section divided from the data. Accordingly, the DRP control portion 106 first allocates the objects of the first page to the four DRPs 1 to 4 in sequence. In FIG. 10, each oblong rectangular box represents 1 object. In the example illustrated in FIG. 10, the first page includes five objects. First, the five objects are respectively allocated from a leading one thereof to the DRPs 1 to 4 one-on-one. Then, the DRPs 1 to 4 processes the objects respectively allocated thereto in parallel. The remaining one object is allocated to the DRP 4 which completes the image processing of the object first allocated thereto fastest. In the example illustrated in FIG. 10, time required to perform the processing of the first page is equal to that required by the DRP 2 to process the object that is largest in size.

Upon completion of image processing of the first page by the DRP, the host CPU 100 configures image data of the first page using a result of the image processing. The host CPU 100 supplies the image data of the first page to the print engine 140. In parallel with the configuring of the software processing by the host CPU 100, the DRP control portion 106 allocate the objects of the second page to the DRPs 1 to 4, respectively, and perform parallel processing on the allocated objects of the second page. Upon completion of image processing of the second page by the DRPs, the host CPU 100 configures image data of the second page using a result of the processing. Then, the host CPU 100 supplies the configured image data to the print engine 140. Such a process is performed on third and fourth pages of the first section.

In parallel with the image processing with hardware (HW) by the DRPs 1 to 4, the host CPU 100 performs the second division A and the parallel method determination B for the second section. The speed of image processing by the DRPs is higher than that of image processing by software. However, because an amount of image data to be processed by the DRPs is extremely large, the image processing by the DRPs takes much longer time than that taken by the software processing of the section division A and the parallel method determination B. Thus, it is useful to perform the section division A and the parallel method determination B in an extremely small part of a long time-period in which the image processing is performed by the hardware. In the example illustrated in FIG. 10, the section division A and the parallel method determination B are performed between the processing of configuring the page image of the second image and that of configuring the page image of the third image. However, this is only an example.

Thus, upon completion of image processing of the data up to the fourth page of the first section, the DRP control portion 106 allocates the second section to the DRPs 132 according to results of the determination of the parallel method corresponding to the second section.

Figure 11:
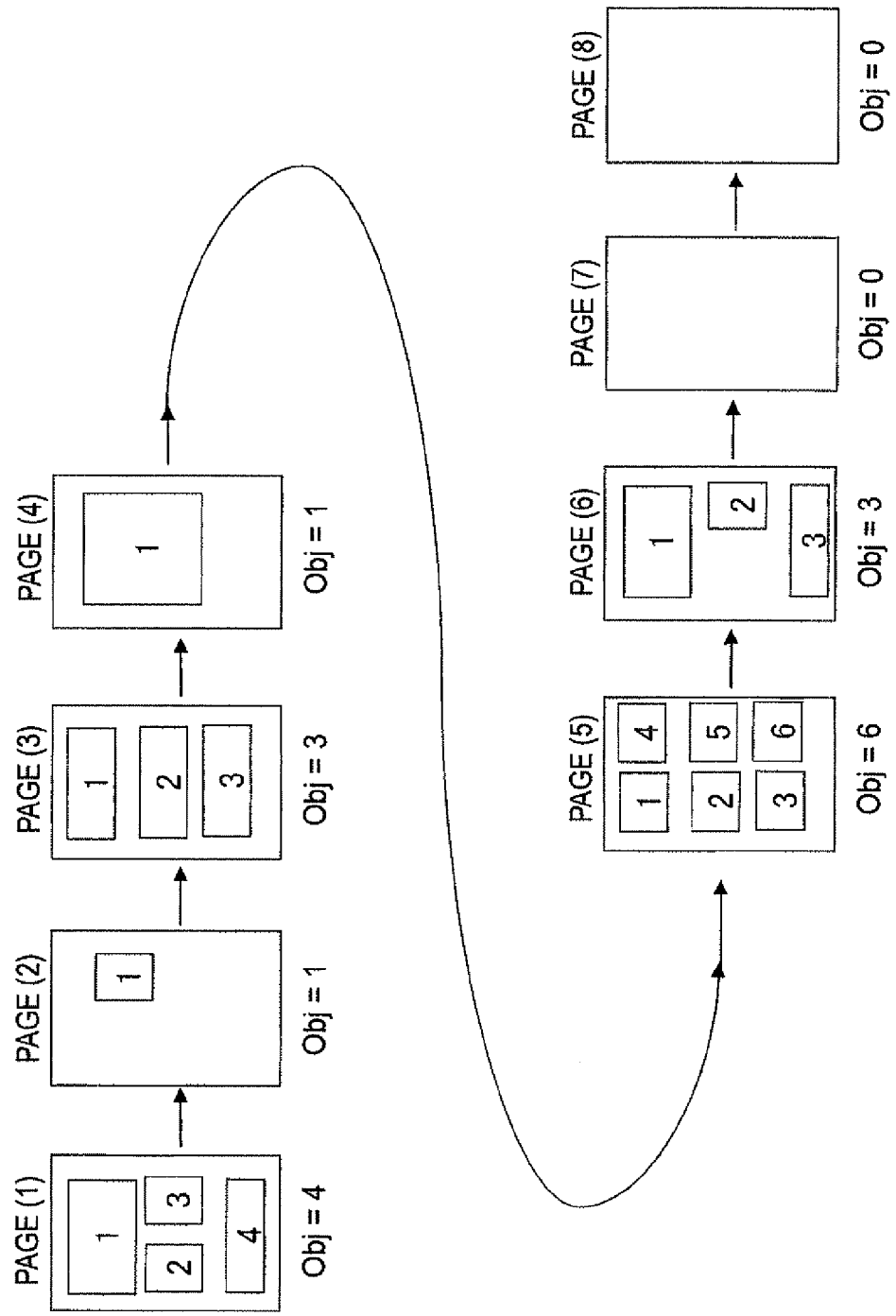
FIG. 11 is a diagram illustrating an example of plural of pages differing from one another in the number of contained objects.

Next, how the parallel method to be performed on each section is determined is described by giving a practical example of print document data. It is assumed that in this example, the print document data is configured by 8 pages illustrated in FIG. 11. In each of pages 1 to 8, numbered rectangular boxes represent objects contained therein. For example, the page 1 contains 4 objects, while the page 2 contains 1 object. The pages 7 and 8 contain no object (the pages 7 and 8 are, e.g., pages contain only texts and do not need to be subjected to image processing). FIG. 12 illustrates the data contents of the object table concerning the print document data. In the case of this example, all objects of all pages are such that the value of the "comparison-of-size-to-threshold" (see FIG. 2) is "1". That is, the all objects of all pages are to be subjected to image processing by the DRPs (however, the pages 7 and 8 contain no objects).

Figure 13A:
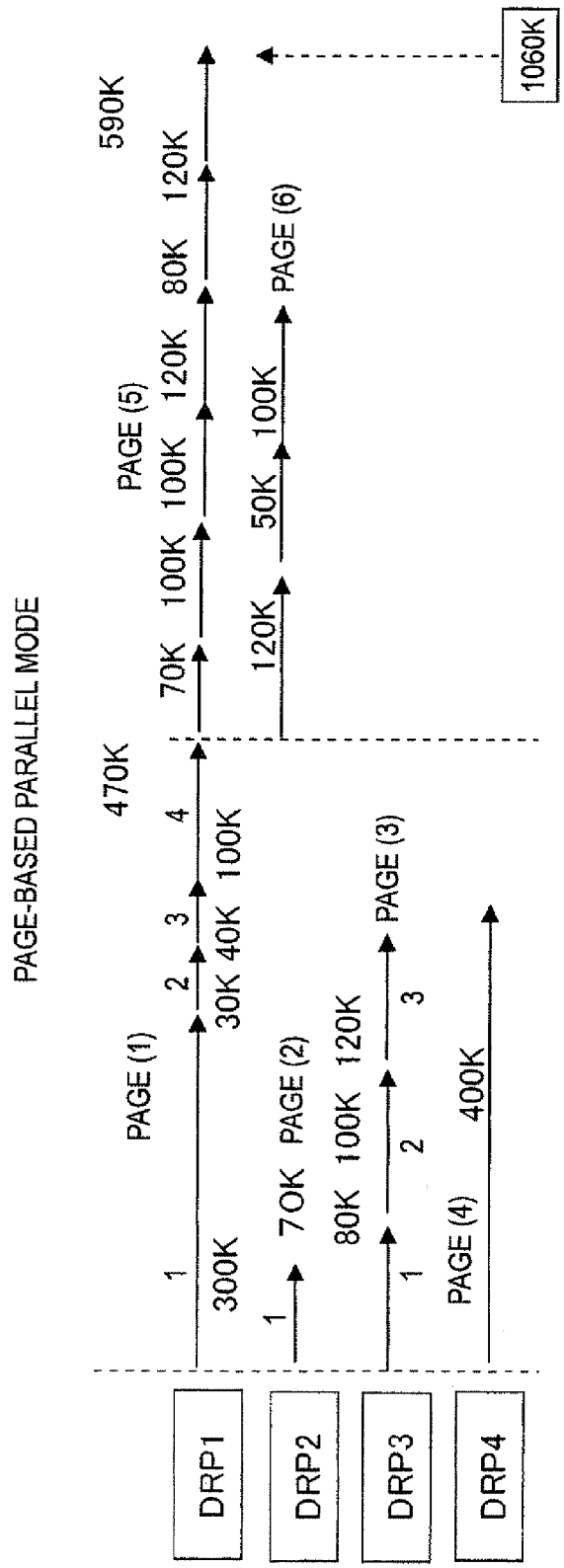
FIG. 13A is a diagram illustrating how to progress, according to the page-based parallel method to be performed in units of sections, the processing of the page group exemplified in FIG. 11.

Consider that the four DRPs 1 to 4 perform the parallel processing of such print document data. In this case, if the page-based parallel method is always employed, the image processing of a section containing pages 1 to 4 takes time equal to a processing time (corresponding to 470 Kbytes) required to process the page 1 which is maximum in the total data size of objects (a total data size of 470 Kbytes), as illustrated in FIG. 13A. The image processing of the next section including pages 5 and 6 (the pages 7 and 8 contain no objects and thus are not subjected to the image processing) takes time equal to a processing time (corresponding to 590 Kbytes) required to process the page 5 which is maximum in the total data size of objects (a total data size of 590 Kbytes). Accordingly, the image processing of all the pages 1 to 8 takes a processing time corresponding to the total data size=470 Kbytes+590 Kbytes=1060 Kbytes.

Figure 13B:
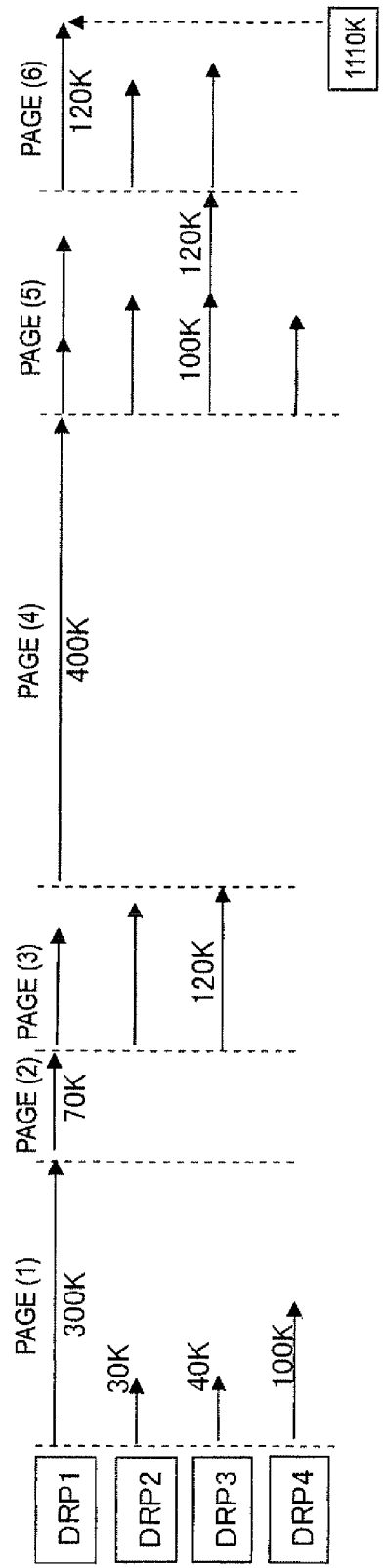
FIG. 13B is a diagram illustrating how to progress, according to the paginal-object-based parallel method to be performed on each page, the processing of the page group exemplified in FIG. 11.

If the paginal-object-based parallel method is always employed, as shown in FIG. 13B, first, a processing time required to process the page 1 is equal to a processing time of an object having a maximum data size (300 Kbytes) among objects contained in the page 1. A processing time required to process the page 2 including only 1 object is equal to a processing time required to process the object having a data size (70 Kbytes) as a whole. While the processing of the page 2 is performed, each of the DRPs 2 to 4 other than the DRP 1 processing the object contained in the page 2 is in an idle state. Similar idle states of the DRPs may occur while the processing of the pages 3, 4, and 6 is performed. Time taken to perform image processing of all 8 pages is a total-sum of processing times respectively required to process the pages 1 to 8. Accordingly, the image processing of all the pages 1 to 8 takes a processing time corresponding to the total data size=1110 Kbytes.

Figure 13C:
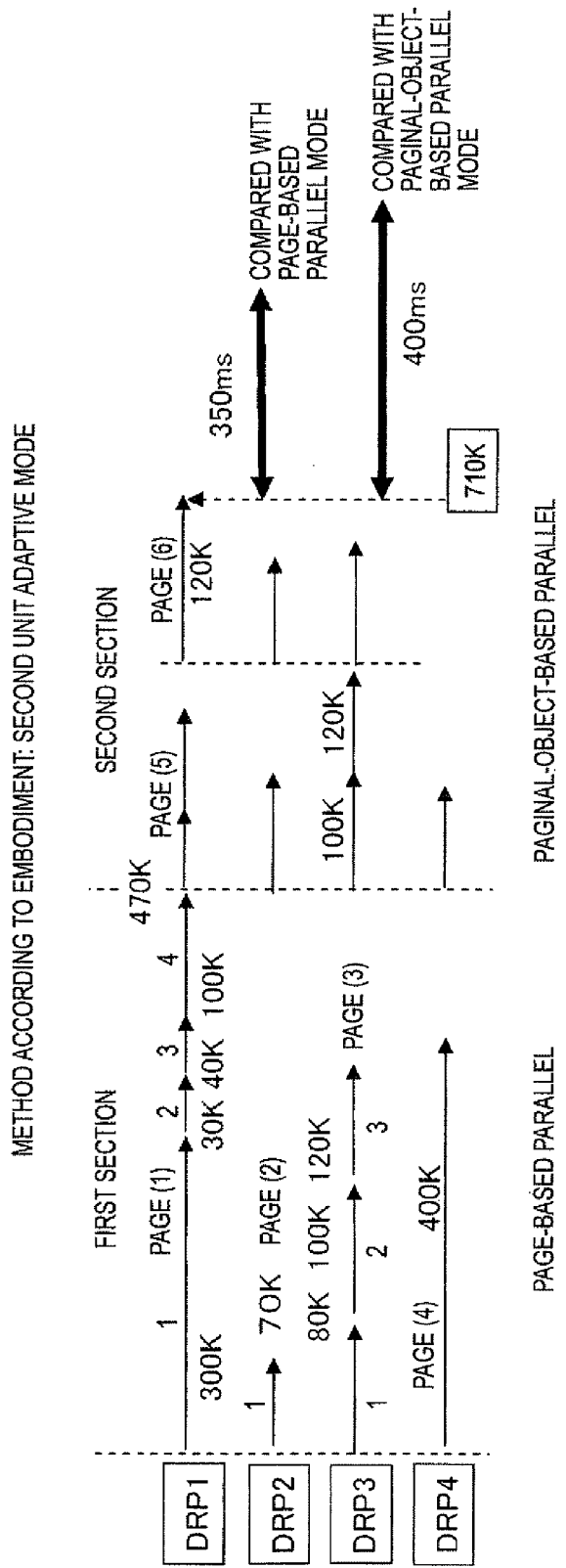
FIG. 13C is a diagram illustrating how to progress the processing of the page group exemplified in FIG. 11, by a method according to an exemplary embodiment of the invention.

FIG. 13C illustrates a flow of image processing performed under the control according to the present exemplary embodiment in which the parallel method is adaptively selected corresponding to each section, as compared with the above exemplified case of always using the same parallel method. In this example, the page-based parallel method is selected for the first section including the pages 1 to 4. The paginal-object-based parallel method is selected for the second section including the pages 5 and 6. In this case, time taken to process all 8 pages, which corresponds to a data size of 710 Kbytes, because a time required by the processing of the first section corresponds to a data size of 470 Kbytes and a time required by the processing of the second section corresponds to a data size of 240 Kbytes. If a processing time required by the DRP corresponding to a data size of 1 Kbytes is 1 millisecond (ms), a processing time required by the adaptive selection method according to the present exemplary embodiment is shorter than that required by the case of always employing the page-based parallel method by 350 ms and than that required by the case of always employing the paginal-object-based parallel method by 400 ms.

As described above, according to the present exemplary embodiment, the print document data is divided into sections each of which includes pages of the number equal to that of the DRPs. The parallel method is selected corresponding to each of the sections. If there is a page containing no target-objects which the DRP is requested to perform image processing thereon, this page is not included by the section. Instead, a subsequent page containing such a target-object is included by the section. Accordingly, all pages of each of the sections containing a target-object. When the page-based parallel method is selected as the parallel method corresponding to a section, each DRP necessarily handles the image processing of 1 page. Thus, there is no DRP brought into a completely idle state. When the paginal-object-based parallel method is selected, a processing time required to perform the image processing of the entire section is shorter than that required to perform the image processing of the entire section when the page-based parallel method is selected. In this case, even if there is a DRP which may be brought into an idle state when the paginal-object-based parallel method is selected, the speed of the image processing of the entire section in the case of selecting the paginal-object-based parallel method is higher than that of the image processing of the entire section in the case of selecting the page-based parallel method.

In order to reduce a first-print-output-time (FPOT: a time since a print start instruction is issued until a first page is output), it is advisable to necessarily employ the paginal-object-based parallel method for a first page and to perform the adaptive selection method corresponding to each section, which has been disclosed in the description of the above exemplary embodiment, for second and later pages. Alternatively, instead of necessarily employing the paginal-object-based parallel method, the following modification may be made. That is, the adaptive selection method is performed from the first page if the first page contains only one object. However, if the first page contains plural of objects (limited to targets to be requested to the DRP to perform the image processing thereon), the paginal-object-based parallel method is selected corresponding to the first page. In addition, the adaptive selection method according to the present exemplary embodiment is used corresponding to the second and later pages.

Alternatively, another modification may be made as follows. That is, if the total number of pages of the print document data is less than the number of the DRPs, the paginal-object-based parallel method is automatically selected.

In the description of the above exemplary embodiments, the DRPs 132 are exemplified as hardware image processing circuits that handle specific image processing requested from the host CPU 100. However, the DRP 132 is only an example of the hardware image processing circuit according to the invention. Instead of the DRPs 132, N integrated circuits (e.g., application specific integrated circuits (ASIC) or large scale integration (LSI) circuits) configured by integrating hardware logic circuits for each type of processing which configures specific image processing may be provided in parallel.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A print image processing apparatus, comprising:
N image processing circuits, N is an integer equal to or more than 2;
a dividing unit that divides print data into sections, each section having N pages;
a selection unit that estimates, every section of N pages, a necessary time corresponding to each of (i) a page-based parallel method for allocating image processing of the N pages to the N image processing circuits in units of pages to perform the image processing of the N pages in parallel, and (ii) a paginal-object-based parallel method for allocating image processing of each single page to the N image processing circuits in units of objects to perform the image processing of the objects of each single page in parallel, and selects one of the page-based parallel method and the paginal-object-based parallel method such that the estimated necessary time corresponding to the selected one of the parallel methods is shorter than the estimated necessary time corresponding to the other parallel method; and an allocation unit that allocates image processing of the N pages to the N image processing circuits, respectively, according to the parallel method selected by the selection unit.

2. The print image processing apparatus according to claim 1, wherein
the selection unit is implemented by causing a computer to execute a program describing a function of the allocation unit; and
while the N image processing circuits perform image processing of the N pages respectively allocated thereto, the selection unit selects the parallel method corresponding to next N pages.

3. The print image processing apparatus according to claim 1, wherein
the selection unit selects the paginal-object-based parallel method as the parallel method corresponding to the N pages when a necessary time required to perform image processing of a later one of the N pages according to the page-based parallel method is shorter than that required to perform image processing of an earlier one of the N pages according to the page-based parallel method by a threshold or more even if the necessary time required to perform the image processing of the N pages according to the page-based parallel methods shorter than that required to perform the image processing of the N pages according to the paginal-object-based parallel method.

4. The print image processing apparatus according to claim 1, wherein
the selection unit sets a page containing no objects serving as a processing target to be processed by the image processing circuit, among pages of a print target document, not to be included in the N pages to be used as a unit whose image processing is allocated to the N image processing circuits, and sets a subsequent page containing one or more objects serving as the processing target to be included in the N pages to be used as the unit.

5. The print image processing apparatus according to claim 1, further comprising:
a first page parallel processing unit that allocates each object contained in a first page of a print target document to an associated one of N the image processing circuits to cause the N image processing circuits to perform parallel processing of the objects respectively allocated thereto,
wherein the selection unit selects the parallel method every section of N pages of a second page and later pages of the print target document.

6. A non-transitory computer readable medium storing a program causing a computer to execute a process for connecting N image processing circuits, N is an integer equal to or more than 2, the process comprising:
dividing print data into sections, each section having N pages;
estimating, every section of N pages, a necessary time corresponding to each of a page-based parallel method for allocating image processing of the N pages to the N image processing circuits in units of pages to perform the image processing of the N pages in parallel, and a paginal-object-based parallel method for allocating image processing of each single page to the N image processing circuits in units of objects to perform the image processing of the objects of each single page in parallel,
selecting one of the page-based parallel method and the paginal-object-based parallel method such that the estimated necessary time corresponding to the selected one of the parallel methods is shorter than the estimated necessary, time corresponding to the other parallel method; and
allocating image processing of the N pages to the N image processing circuits, respectively, according to the parallel method selected by the selecting.

7. The process according to claim 6, wherein
while the N image processing circuits perform image processing of the N pages respectively allocated 1 hereto, the selecting selects the parallel method corresponding to next N pages.

8. The process according to claim 6, wherein
the selecting selects the paginal-object-based parallel method as the parallel method corresponding to the N pages when a necessary time required to perform image processing of a later one of the N pages according to the page-based parallel method is shorter than that required to perform image processing of an earlier one of the N pages according to the page- based parallel method by a threshold or more even if the necessary time required to perform the image processing of the N pages according to the page-based parallel method is shorter than that required to perform the image processing of the N pages according to the paginal- object-based parallel method.

9. The process according to claim 6, wherein
the selecting sets a page containing no objects serving as a processing target to be processed by the image processing circuit, among pages of a print target document, not to be included in the N pages to be used as a unit whose image processing is allocated to the N image processing circuits, and sets a subsequent page containing one or more objects serving as the processing target to be included in the N pages to be used as the unit.

10. The process according to claim 6, further comprising:
allocating each object contained in a first page of a print target document to an associated one of N the image processing circuits to cause the N image processing circuits to perform parallel processing of the objects respectively allocated thereto,
wherein the selecting selects the parallel method every section of N pages of a second page and later pages of the print target document.

* * * * *